US008337804B2

(12) United States Patent
Heidelberg et al.

(10) Patent No.: US 8,337,804 B2
(45) Date of Patent: Dec. 25, 2012

(54) SYNTHESIS OF NANOPARTICLES COMPRISING METAL (III) VANADATE

(75) Inventors: Thorsten Heidelberg, Hamburg (DE); Christiane Meyer, Hamburg (DE); Imke Kühl, Lübeck (DE)

(73) Assignee: Centrum fur Angewandte Nanotechnologie (CAN) GmbH, Hamburg (DE)

( * ) Notice: Subject to any disclaimer, the term of this patent is extended or adjusted under 35 U.S.C. 154(b) by 927 days.

(21) Appl. No.: 10/554,903

(22) PCT Filed: Apr. 28, 2004

(86) PCT No.: PCT/EP2004/004488
§ 371 (c)(1),
(2), (4) Date: Dec. 4, 2006

(87) PCT Pub. No.: WO2004/096714
PCT Pub. Date: Nov. 11, 2004

(65) Prior Publication Data
US 2007/0148082 A1   Jun. 28, 2007

(30) Foreign Application Priority Data
Apr. 28, 2003   (EP) .................................... 03008854

(51) Int. Cl.
*C01G 31/02* (2006.01)
(52) U.S. Cl. ................................. 423/594.17
(58) Field of Classification Search .......................... None
See application file for complete search history.

(56) References Cited

U.S. PATENT DOCUMENTS

| | | | |
|---|---|---|---|
| 3,647,706 A | 3/1972 | Lagos | |
| 4,041,319 A | 8/1977 | Fukuzawa et al. | |
| 4,107,571 A | 8/1978 | Tanimizu et al. | |
| 5,573,749 A * | 11/1996 | Illig | 424/9.45 |
| 5,718,919 A * | 2/1998 | Ruddy et al. | 424/489 |
| 2002/0192147 A1 | 12/2002 | Choi et al. | |
| 2003/0032192 A1* | 2/2003 | Haubold et al. | 436/56 |
| 2005/0008877 A1 | 1/2005 | Chane-Ching et al. | |

FOREIGN PATENT DOCUMENTS

| | | |
|---|---|---|
| DE | 2 010 778 | 9/1970 |
| EP | 1 106 668 A2 | 6/2001 |
| FR | 2 829 481 | 3/2003 |
| JP | 2004283822 A | 10/2004 |
| RU | 2034898 | 5/1995 |
| WO | WO 02/20696 A1 * | 3/2002 |

OTHER PUBLICATIONS

Schuetz, Peter and frank Caruso, Electrostatically Assembled Fluorescent Thin Films of Rare-Earth-Doped Lanthanum Phosphate Nanoparticles, 2002, Chem. Mater., 14, pp. 4509-4516.*
Feldmann, C. and H.-O. Jungk, Preparation of sub-micrometer LnPO4 particles (Ln=La, Ce), 2002, Journal of Materials Science, 37, pp. 3251-3254.*
Riwotzki et al, Colloidal YVO4:Eu and YP0.95V0.05O4:Eu Nanoparticles: Luminescence and Energy Transfer Processes, 2001, j. phys. chem, pp. 12709-12713.*
Schuetz et al, Electrostatically Assembled Fluorescent Thin Films of Rare-Earth-Doped Lanthanum Phosphate Nanoparticles, 2002, chem. mater, 4509-4516.*
Huignard A. et al., "Synthesis and Characterizations of YVO4: Eu Colloids", *Chem. Mater.* 14(5):2264-2269 (2002).
European Patent Application No. EP 1 106 668 A2, dated Jun. 13, 2001.
German Laid-Open Patent Publication No. 2 010 778, dated Sep. 10, 1970.
United States Patent No. 3,647,706, issued to Lagos, dated Mar. 7, 1972.
United States Patent No. 4,107,571, issued to Tanimizu et al., dated Aug. 15, 1978.
United States Patent No. 4,041,319, issued to Fukuzawa et al., dated Aug. 9, 1977.
Abstract XP-002254864, "Manufacture of luminescent thin films".
Serra, O.A. et al., "A new procedure to obtain $Eu^{3+}$ doped oxide and oxosalt phosphors", Journal of Alloys and Compounds (2000), vol. 303-304, pp. 316-319.
Haase, M. et al. "Synthesis and properties of colloidal lanthanide-doped nanocrystals", Journal of Alloys and Compounds (2000), vol. 303-304, pp. 191-197.
French Patent No. 2 829 481, dated Mar. 14, 2003.
Riwotzki, K. et al., "Wet-Chemical Synthesis of Doped Colloidal Nanoparticles: $YVO_4$:Ln (Ln=Eu, Sm, Dy)", Journal of Physical Chemistry (1998), vol. 102, pp. 10129-10135.
Shantha, K. et al., "Preparation and characterization of nanocrystalline powders of bismuth vanadate", Materials Science and Engineering (1999), vol. 60, No. 1, pp. 66-75.
Riwotzki, K. et al., "Colloidal $YVO_4$: Eu and $YP_{0.95}V_{0.05}O_4$:Eu Nanoparticles: Luminescence and Energy Transfer Processes", Journal of Physical Chemistry (2001), vol. 105, pp. 12709-12713.
Derwent Abstract 2003-059977, "Light-emitting film production"(2002).
Derwent Abstract XP-002290239, "Hydrophobic phosphorescent material—used on signs to be seen in the dark and also outdoors" (1997.

* cited by examiner

*Primary Examiner* — Melvin C Mayes
*Assistant Examiner* — Stefanie Cohen
(74) *Attorney, Agent, or Firm* — Scully, Scott, Murphy & Presser, P.C.

(57) ABSTRACT

The present invention relates to a method for the production of nanoparticulate metal(III) vanadates or vanadate/phosophate mixed crystals, comprising the reaction in a reaction medium of a reactive vanadate source and optionally a phosphate source dissolvable or dispersible in the reaction medium and of a reactive metal(III) salt dissolvable or dispersible in the reaction medium under heating, wherein the reaction medium contains water and a polyol in a volume ratio of 20/80 to 90/10, and the particles thereby obtained. The synthesis provides a high yield of metal(III) vanadate or vanadate/phosphate having a narrow particle size distribution. Doped embodiments thereof are distinguished by excellent luminescence properties.

16 Claims, No Drawings

SYNTHESIS OF NANOPARTICLES COMPRISING METAL (III) VANADATE

The present invention relates to the synthesis of nanoparticles comprising metal(III) vanadates and to the particles obtainable according to this synthesis, in particular luminescent lanthanide- and/or bismuth-doped metal vanadates or metal vanadate/phosphate mixed crystals.

BACKGROUND OF THE PRESENT INVENTION

It has been known for a long time that various doped rare earth metal vanadates have luminescent properties. $YVO_4$:$Eu^{3+}$ is e.g. industrially used as a red luminescent material in cathode ray tubes or in colour television sets (U.S. Pat. No. 3,360,674) and fluorescence lamps. In its mono-crystalline form, it has also been used as a polarisator and as laser material (R. A. Fields et al., *Applied Physical Letters* 51, 1885, 1987).

The luminescent properties of yttrium vanadate doped with Tm, Tb, Ho, Er, Dy, Sm or In, of $GdVO_4$:Eu and $LuVO_4$:Eu are also known in literature (see *Ullmanns Encyclopedia of Industrial Chemistry*, Wiley-VCH, 6$^{th}$ ed., 1999, volume A15, *Luminescent Materials* and the publications cited therein). Further luminescent vanadates are e.g. known from U.S. Pat. No. 6,203,726.

In the development of lasers, $GdVO_4$:Tm, Ho and $GdVO_4$:Nd crystals have been used with a diode laser as an excitation source (see P. J. Morris et al., Opt. Commun., (Netherlands) 111, 439 (1994) and P. K. Mukhopadhyay et al., *National Laser Symposium,* CAT, Indore (India) 49 (Feb. 6-8, 1997)). $GdVO_4$:Bi powder was proposed as a scintillation material in computer tomography (G. Leppert et al., *Applied Physics A*59, 69 (1994)). That the co-doping of europium-doped yttrium and gadolinium vanadates promotes the $Eu^{3+}$ emission intensity and shifts the excitation wavelengths to longer wavelengths at the same time, whereby an excitation with UV-A becomes possible, is also known from literature (S. Z. Toma et al., *J. Electrochem. Soc.* 114,9 (1967), pages 953-955; R. K. Datta et al., *J. Electrochem. Soc.* 114, 10 (1967), pages 1058-1063 and B. N. Mahalley et al., *Applied Physics A* 70, 39-45 (2000)).

These vanadates are conventionally produced by mixing oxidic starting materials and their calcination at high temperatures, whereby a macro-crystalline material is obtained. Many industrial applications, however, require the homogenous dispersion of the vanadates in liquid media (e.g. aqueous or organic solvents) or solid media (e.g. polymer materials). If the macro-crystalline material is to be transferred into a fine-crystalline material, additional process steps are required, such as milling and size selection. Not only is the yield of useful particles reduced thereby but this also leads to contaminations, e.g. by mechanical abrasion during the milling steps. These contaminations can also have negative effects on the quantum yield (ratio of emitted to absorbed photones).

For this reason, recently efforts have been undertaken to obtain nanoparticulate vanadates as a product of a direct synthesis. "Nanoparticulate" means that the diameter (measured at the longest axis for non-spherical particles) is less than 1 µm. In connection therewith, it is of particular interest to obtain nanoparticles having a diameter of less than 30 nm since they no longer interact with the light incident on a medium and the dispersion thus becomes transparent.

K. Riwotzky and M. Haase (*J. Phys. Chem. B* 1998, 102, 10129-10135) described for the first time the wet-chemical synthesis of doped colloidal nanoparticles of the formula $YVO_4$:Ln (Ln=Eu, Sm, Dy). The synthesis starts with the corresponding metal nitrates and $Na_3VO_4$, which were dissolved in water and reacted for one hour at 200° C. in an autoclave. The process, however, leads to a broad size distribution of the vanadate nanoparticles and requires complex purification and size selection steps in order to isolate particles in the range of 10 to 30 nm. The yield of the nanocrystalline $YVO_4$:Eu after dialysis thus only amounted to 3%. The authors indicate a quantum yield (ratio of the emitted photones to the absorbed photones) of 15% at room temperature in water for an yttrium vanadate doped with 5% $Eu^{3+}$. This quantum yield is significantly below that of the macrocrystalline material which was ascribed to the essentially higher surface-volume ratio of nanoparticles in connection with luminescence quenching processes occuring at the surface.

A. Huignard et al. in Chem. Mater. 2002, 14, pages 2264-2269 describe the synthesis and characterization of $YVO_4$:Eu colloides having a particle diameter of approximately 10 nm. The synthesis was performed by reaction of yttrium and europium nitrate in the corresponding molar ratio as well as sodium citrate and $Na_3VO_4$ in water. Various dialysis steps follow after 30 minutes of ageing of the solution at 60° C. The size distribution obtained was more narrow-than with. Riwotzky and Haase but nevertheless relatively broad with a standard deviation of 37.5% (average size 8 nm, standard deviation 3 nm). No exact indications were made on the particle yield. According to the authors, a quantum yield of 16% is obtained for europium-doped yttrium vanadates only with a content of europium of x=0.20 (20%). The authors assume that lattice defects which prevent the energy transfer are responsible for this.

The synthesis of nanoparticulate transition-metal oxide pigments, such as $CoAl_2O_4$, $Cr_2O_3$, $ZnCo_2O_4$, $(Ti_{0.85}, Ni_{0.05}, Nb_{0.10})O_2$, $\alpha$-$Fe_2O_3$ und $Cu(Cr,Fe)O_4$, in diethylene glycol at 140° C. is described in C. Feldmann, *Advanced Materials*, 2001, 13, no. 17, pages 1301-1303. The average particle diameter of the pigments ranges between 50 and 100 nm.

Also non-doped vanadates are of interest for industrial applications. WO 02/072154 e.g. discloses the use of nanoparticulate $GdVO_4$ as contrast medium in medical diagnosis methods based on NMR, such as the computer tomography. The $GdVO_4$ synthesis described therein uses the methods of Riwotzky and Haase and therefore has the same disadvantages.

The object of the present invention was therefore to provide a new synthesis for nanoparticles comprising metal(III) vanadates which leads to a narrow particle size distribution without further size selection steps at a high yield.

According to a further aspect of the invention, a synthesis is intended to be provided which leads to nanoparticles comprising metal(III) vanadate which can be easily dissolved in water and alcohols, but also in aprotic organic media in accordance with a preferred embodiment.

It is a further object of the present invention to provide nanoparticles comprising metal(III) vanadates in a narrow particle size distribution which can easily be dissolved in water and alcohol, but also in aprotic organic media in accordance with a preferred embodiment.

According to a preferred embodiment and a further aspect of the technical object, luminescent nanoparticles comprising metal(III) vanadate with comparatively high quantum yields should further be provided.

According to one further preferred embodiment and aspect of the technical object, a synthesis method for nanoparticles is to be provided which can be easily conducted in larger scale.

Other technical objects can be derived from the following description of the invention.

SUMMARY OF THE INVENTION

The above-described technical objects are achieved by a method for the production of nanoparticles comprising metal (III) vanadates, said method comprising the reaction in a reaction medium of a reactive vanadate source dissolvable or dispersible in the reaction medium and of a reactive metal(III) salt dissolvable or dispersible in the reaction medium under heating, wherein the reaction medium contains water and at least one polyol at a volume ratio of 20/80 to 90/10, and the metal(III) vanadates obtainable according to this method.

Said "nanoparticles comprising metal(III) vanadate" may represent doped or undoped metal(III) vanadates, or doped or undoped metal(III) vanadate/phosphate mixed crystals.

In the second case, the above reaction medium also comprises a phosphate source dissolvable or dispersible in the reaction medium.

According to one embodiment, the method comprises a subsequent reaction in an autoclave and/or surface treatment.

According to a second embodiment, the method of the invention is directly conducted in an autoclave. This embodiment is particularly suitable for conducting the reaction in larger scale.

The particles obtained by the claimed methods are characterized by high quantum yields and their dispersibility in water and organic media.

DETAILED DESCRIPTION OF THE INVENTION

The method according to the invention serves for the production of nanoparticulate material comprising metal(III) vanadates.

The term "nanoparticulate", as was explained above, preferably relates to particles having a diameter of less than 30 nm. The particles of the invention are preferably spherical. If their shape is not spherical (e.g. ellipsoid, needle-shaped), the term diameter relates to the longest axis of the particle. The average diameter preferably ranges from 1 to 25 nm, more preferred from 2 to 20 nm, particularly preferred from 5 to 15 nm. It may, for example, be determined by transmission electron microscopy (TEM). For determining the average diameters and the standard deviation, the analytical ultra-centrifugation (AUZ), which is known in this technical field, is also suited. Prior to the analytical ultra-centrifugation, it may be checked by means of TEM or also XRD measurements whether the particles are present in the non-aggregate state, in order to prevent a falsification of the measuring results.

The method according to the invention leads to very narrow particle size distributions which can be described by standard deviations from the mean value of preferably less than 30%, in particular less than 25%.

The term "nanoparticles comprising metal(III) vanadate" is to be understood as covering doped or undoped metal(III) vanadates, or doped or undoped metal (III) vanadate/phosphate mixed crystals. For the sake of brevity, the term "metal (III) vanadate or vanadate/phosphate" will be used in the following as synonym for "nanoparticles comprising metal (III) vanadate" if not stated otherwise.

The term "vanadate" comprises orthovanadate (VO$_4$) and polyvanadate, the former being preferred.

With "mixed crystal", we mean a solid solution wherein metal(III) vanadate and metal(III) phoshate mutually dissolve each other. The term "phosphate" comprises orthophosphate (PO$_4$) and polyphosphates, the former being preferred. The mixed crystal may conform to the-chemical formula

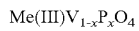

wherein Me is a trivalent metal atom and 0<x<1, x values ranging from 0.2 to 0.6, in particular 0.3 to 0.5 being preferred. Surprisingly, it has been found that these mixed crystal systems, if suitably doped, show much higher quantum yields than the corresponding vanadates. Without wishing to be bound by theory, it is believed that the presence of phosphate stabilizes the vanadate (+V) oxidation state thereby increasing the luminescence (fluorescence) yield. The quantum yields of europium-doped vanadate/phosphate nanoparticles can for instance reach values of about 20 mol %. Another benefit drawn from the admixture of phosphate to the crystal lattice seems to be a diminished crystal size under the same reaction conditions (reaction in autoclave, i.e. "second process embodiment" and approximately stoichiometric ratio of metal (III) salt(s) to vanadate (and phosphate) source), for instance average diameters of 5 nm to 15 nm, e.g. about 10 nm, instead of more than 15 nm.

The trivalent metal atom of the vanadate or vanadate/phosphate nanoparticle can be any metal and is preferably selected under metals of the group 13 (Al, Ga, In, Tl), bismuth and rare earth metals, i.e. Sc, Y and La as well as the lanthanides (Ce, Pr, Nd, Pm, Sm, Eu, Gd, Tb, Dy, Ho, Er, Tm, Yb or Lu).

The metal vanadate or vanadate/phosphate nanoparticles of the invention are preferably doped, luminescent systems. Luminescence characterizes the property of the nanoparticles to absorb energy (e.g. in the form of photones, electron rays or X-rays) which is then emitted as radiation of a lower energy. The term "luminescence" includes the preferred property of "photoluminescence" in the entire application and in the claims.

Luminescent properties are obtained, in that one or a plurality of metal atoms imparting luminescence are incorporated in a suitable host lattice. The term "doping" is to be understood broadly. The upper molar portion of the doping substance should not lead to a concentration quenching phenomenon. It therefore depends on factors, such as the distance between the doping metals in the host lattice and the kind of the doping substance, and therefore varies from system to system. The host lattice metal (metal(III) vanadate or vanadate/phosphate) is preferably replaced by the doping substance in an amount of up to 50% by mole, more preferred 0.1 to 40% by mole, still more preferred 0.5 to 30% by mole, in particular 1 to 25% by mole.

According to a preferred embodiment of the present invention, yttrium and lanthanum vanadate, in particular yttrium vanadate, or yttrium and lanthanum vanadate/phosphate, in particular yttrium vanadate/phosphate is selected as the host lattice and this is doped with one or a plurality of metals selected from the lanthanides, indium, or bismuth. Suitable doping substances are e.g. Eu, Tm, Tb, Ho, Er, Dy, Sm, In or Bi. Particularly preferred is the individual doping with Eu or Bi or the combined doping with Eu and Bi. It is further known to use Ce in combination with Nd, Dy or Tb, or Er in combination with Yb as the doping substance pair.

In accordance with a further preferred embodiment, a vanadate or vanadate/phosphate of a lanthanide is doped as the host lattice with another suitable lanthanide and/or bismuth. It is, for example, preferred to dope gadolinium vanadate or vanadate/phosphate with one or a plurality of metals selected from Eu, Bi, Tm, Ho or Nd. Particularly preferred is the individual doping with Eu or Bi or the combined doping with Eu and Bi. It is also conceivable to dope cerium vanadate or vanadate/phosphate with at least one lanthanide selected from Nd, Dy, Tb and Sm. The Yb doping of erbium vanadate or vanadate/phosphate is also possible.

Based on the absorption and emission characteristics, the skilled person is in the position to determine suitable host lattice/doping substance combinations. For the host lattice metal atom lanthanides having high absorption cross sections, such as Ce, Gd or Yb, are an attractive choice which can transfer their energy to the doping substance when their emission spectra overlap with the absorption spectra of the doping substance, which then emits this energy in the form of luminescence.

Particularly preferred metal (III) vanadate nanoparticles include $BiVO_4$; $YVO_4$:Eu; $YVO_4$:Bi; $YVO_4$:Eu,Bi; $YVO_4$ doped with Tm, Tb, Ho, Er, Dy, Sm or In; $GdVO_4$:Eu; $GdVO_4$:Bi; $GdVO_4$:Eu,Bi; $GdVO_4$:Tm, Ho; $GdVO_4$:Nd; or $(Y_{0.82}Al_{0.07}La_{0.06})VO_4$:$Eu_{0.05}$.

Preferred metal(III)vanadate/phosphate nanoparticles include $BiV_{1-x}P_xO_4$; $YV_{1-x}P_xO_4$:Eu; $YV_{1-x}P_xO_4$:Bi; $YV_{1-x}P_xO_4$:Eu,Bi; $YV_{1-x}P_xO_4$ doped with Tm, Tb, Ho, Er, Dy, Sm or In; $GdV_{1-x}P_xO_4$:Eu; $GdV_{1-x}P_xO_4$:Bi; $GdV_{1-x}P_xO_4$:EU,Bi; $GdV_{1-x}P_xO_4$:Tm,Ho; $GdV_{1-x}P_xO_4$:Nd; or $(Y_{0.82}Al_{0.07}La_{0.06})V_{1-x}P_xO_4$:$Eu_{0.05}$, wherein $0<x<1$, more preferably 0.2 to 0.6, in particular 0.3 to 0.5.

I. Method of Preparation for Vanadate and Vanadate/Phosphate Nanoparticles

The method according to the invention is carried out in a mixture of water and one polyol at a volume ratio of 20/80 to 90/10, more preferred 30/70 to 80/20, still more preferred 35/65 to 70/30, and in particular 40/60 to 60/40, based on the volume at 25° C. It was surprisingly found that the luminescence property of the doped vanadate or doped vanadate/phosphate is also somewhat reduced when the water content is reduced. However, too high contents of water can lead to an early precipitation of the product in the reaction system.

As polyol, each organic compound can be used which has 2, 3 or more hydroxy groups and is fully miscible with water in the volume ratio and at the reaction temperature employed. The polyol preferably consists of the elements C, H and O only. Examples for suitable polyols are organic di- or trihydroxy compounds having a molecular weight of not more than 200, e.g. glycerol, ethylene glycol or polyethylene glycol (the preferred average number of ethylene glycol units is up to 4). Other mono- or polyalkylene glycoles can also be used if they are miscible with water under the reaction conditions.

The synthesis according to the invention is performed with heating, i.e. above room temperature (25° C.). To prevent too long reaction times, it is preferred that the reaction is performed at a temperature of at least 100° C. The upper reaction temperature is predetermined at ambient pressure by the selection of the solvent. If the temperatures are too high (e.g. more than 220° C. or more than 250° C.), negative influences on the fluorescence properties of doped systems are sometimes to be observed, so that the preferred temperature ranges from 110 to 200° C., in particular from 120 to 180° C. or 180 to 200° C. depending from the process variant chosen as explained below.

I.1. First Embodiment of the Process

According to a first embodiment of the process according to the present invention, it is possible, but not necessary, to remove by distillation the water portion of the reaction medium during the reaction.

Even if it is in principle possible to carry out the first embodiment of the synthesis method under increased pressure, it is for practical considerations preferred to work under normal pressure (1 bar). Then temperatures of preferably 120 to 180° C. are used for conducting the reaction.

For the above-indicated preferred synthesis temperatures usually a reaction time is selected which ranges from 30 minutes to 3 hours, preferably from 1 to 2 hours.

The skilled person can easily determine a suitable vanadate source for the synthesis according to the invention. It must be reactive, i.e. sufficiently dissolvable, so as to react with the added metal(III)salt and should be dissolvable or dispersible at the same time in the reaction medium under the reaction conditions. Preferred vanadate sources are ammonium and alkali metal vanadates, such as sodium or potassium vanadates, e.g. $Na_3VO_4$ or $Na_3VO_4.10H_2O$.

The same applies to the phosphate sources used for vanadate/phosphate mixed crystals. Suitable phosphate sources are ammonium and alkali metal phosphates, such as sodium or potassium vanadates, e.g. $K_3PO_4$ monohydrate.

The metal(III)salt used as the metal source is also not subject to any further constraints except for the one that it must be sufficiently dissolvable in the reaction medium under the reaction conditions so as to react with the vanadate source to an insoluble metal(III) vanadate or optionally with the phosphate source to an insoluble metal(III) vanadate/phosphate. It is preferably selected from halogenides (e.g. chlorides and bromides, in particular chlorides), nitrates, alkoxides (with 1 to 4 carbon atoms per alkoxide unit), acetates and their hydrates. Rare earth metals are often used as chloride hydrate or nitrate hydrate. For the doped systems, typically mixtures of metal(III) salts are used, the molar ratio of which corresponds to the molar ratio of the host lattice metal/doping metal to be achieved in the product.

It is possible to use the metal(III)salt, i.e. the metal source, in a molar excess based on the amount stoichiometrically required for the reaction with the vanadate source or vanadate and phosphate sources. This molar excess amounts for instance to at least 5%, or at least 10%, or at least 20%. The dispersibility of the obtained product may be promoted thereby. Further, the use of metal(III)salt excesses may contribute to smaller particle sizes. Too high an excess is economically not expedient, so that one upper limit is approximately 100%, in particular 50%.

From an economical point of view, it is however preferred to use the metal(III)salt, i.e. the metal source, in approximately the stoichiometrically required amount for the reaction with the vanadate source or vanadate and phosphate sources. Possible benefits in terms of dispersibility or particle size do not appear to compensate for the loss of costly metal (III) salt.

The pH value of the reaction medium is preferable in the range from 4.0 to 7.0. If required, small amounts of acids or bases are added in order to correspondingly adjust the pH value.

The synthesis according to the invention provides very high yields (85 to 100%) of metal(III) vanadate or vanadate/phosphate also having the desired narrow particle size distribution.

It was surprisingly found that the luminescence properties of the doped vanadate or vanadate/phosphate produced in this manner can further be improved by a subsequent autoclaving step. "Autoclaving" is understood here as a synonym for heating the particles under pressure in a closed system.

If the water portion of the reaction medium was removed by distillation during the reaction, water is added prior to autoclaving in an amount which leads to a volume ratio water/polyol of the autoclaving medium as was previously indicated for the reaction and which has the preferred ranges from 30/70 to 80/20, more preferred from 35/65 to 70/30, and particularly preferred from 40/60 to 60/40.

In addition, it is preferred to allow the reaction mixture to cool down prior to carrying out the autoclaving step.

Autoclaving is preferably carried out in a pressure vessel (autoclave) made of an inert material, e.g. a steel autoclave coated with PTFE, e.g. Teflon®. Preferred temperatures range from 110 to 240° C., more preferred from 160 to 230° C., and especially preferred from 180 to 220° C. The treatment time is preferably from 30 minutes to 4 hours, preferably 1 hour to 3 hours, in particular from 1 to 2 hours. Under these conditions, the pressures in the autoclave range from 15 to 35 bar.

It was surprisingly found that this autoclaving treatment considerably enhances the luminescence properties of doped metal vanadates. The luminescence properties can, for example, be determined via the quantum yield. It is assumed that increased temperature and increased pressure allow an elimination of lattice defects and that thus a more efficient energy transfer and energy emission becomes possible.

I.2. Second Embodiment of the Process

According to a second embodiment of the process according to the present invention, the reaction is conducted under increased pressure (above normal pressure of 1 bar) and preferably in a closed system such as an autoclave. Surprisingly it has been found that this embodiment is particularly suitable for conducting the claimed reaction in larger scale, for instance for producing vanadate or vanadate/phosphate particle amounts in the order of 10 to several 100 g (e.g. 200 g) without an undesired impact on particle size, size distribution or quantum yield.

This embodiment thus relates to a method for the production of nanoparticles comprising a metal(III) vanadate, said method comprising heating under increased pressure (and preferably in a closed system) a reaction medium comprising a reactive vanadate source dissolvable or dispersible in the reaction medium and a reactive metal(III) salt dissolvable or dispersible in the reaction medium, wherein the reaction medium contains water and at least one polyol at a volume ratio of 20/80 to 90/10.

Said "nanoparticles comprising metal(III) vanadate" may represent doped or undoped metal(III) vanadates, or doped or undoped metal(III) vanadate/phosphate mixed crystals.

In the second case, the above reaction medium also comprises a phosphate source dissolvable or dispersible in the reaction medium.

The reaction in the autoclave is preferably carried out in a pressure vessel (autoclave) made of an inert material, e.g. a steel autoclave coated with PTFE, e.g. Teflon®. Preferred temperatures range from 160 to 220° C., in particular 180 to 200° C.

The pressure in the autoclave is mainly governed by factors like the type of reaction mixture (type of polyol, ratio polyol/water, etc.) and reaction temperature. Pressures of 5 to 25 bar, preferably 10 to 15 bar can be employed. For the above-indicated conditions usually a reaction time is selected which ranges from 30 minutes to 4 hours, preferably 1 hour to 3 hours, more preferably from 1 to 2 hours.

The skilled person can easily determine a suitable vanadate source for the synthesis according to the invention. It must be reactive, i.e. sufficiently dissolvable, so as to react with the added metal(III)salt and should be dissolvable or dispersible at the same time in the reaction medium under the reaction conditions. Preferred vanadate sources are ammonium and alkali metal vanadates, such as sodium or potassium vanadates, e.g. $Na_3VO_4$ or $Na_3VO_4 \cdot 10H_2O$.

The same applies to the phosphate sources used for vanadate/phosphate mixed crystals. Suitable phosphate sources are ammonium and alkali metal phosphates, such as sodium or potassium vanadates, e.g. $K_3PO_4$ monohydrate.

The metal(III)salt used as the metal source is also not subject to any further constraints except for the one that it must be sufficiently dissolvable in the reaction medium under the reaction conditions so as to react with the vanadate source to an insoluble metal(III) vanadate or optionally with the phosphate source to an insoluble metal (III) vanadate/phosphate. It is preferably selected from halogenides (e.g. chlorides and bromides, in particular chlorides), nitrates, alkoxides (with 1 to 4 carbon atoms per alkoxide unit), acetates and their hydrates. Rare earth metals are often used as chloride hydrate or nitrate hydrate.

In the doped systems, often mixtures of metal(III) salts are used, the molar ratio of which corresponds to the molar ratio of the host lattice metal/doping substance to be achieved in the product.

It is possible to use the metal(III)salt, i.e. the metal source, in a molar excess based on the amount stoichiometrically required for the reaction with the vanadate source or vanadate and phosphate sources. This molar excess amounts for instance to at least 5%, or at least 10 %, or at least 20%. The dispersibility of the obtained product may be promoted thereby. Further, the use of metal(III)salt excesses may contribute to smaller particle sizes. Too high an excess is economically not expedient, so that one upper limit is approximately 100%, in particular 50%.

From an economical point of view, it is however preferred to use the metal(III)salt, i.e. the metal source, in approximately the stoichiometrically required amount for the reaction with the vanadate source or vanadate and phosphate sources. Possible benefits in terms of dispersibility or particle size do not appear to compensate for the loss of costly metal (III) salt.

The pH value of the reaction medium is preferable in the range from 4.0 to 7.0. If required, small amounts of acids or bases are added in order to correspondingly adjust the pH value.

The synthesis according to the invention provides very high yields (85 to 100%) of metal(III) vanadates also having the desired narrow particle size distribution.

It was surprisingly found that conducting the synthesis of doped or undoped vanadates or vanadate/phosphates under increased pressure (and preferably in a closed system like an autoclave) leads to particles having at least the same favourable properties as particles obtained according to the first embodiment including an autoclaving step while the synthesis is considerably simplified. Since the total synthesis times are reduced by the second embodiment of the process, the reaction medium, in particular the solvent is subjected to less thermal degradation (entailing colored side products), which favors the formation of white vanadate or vanadate/phosphate powders thereby also increasing the quantum yield.

The reaction is preferably carried out in a pressure vessel (autoclave) made of an inert material, e.g. a steel autoclave coated with PTFE, e.g. Teflon®.

II. Some Properties of the Particles Obtained and Their Surface Modification

The metal(III) vanadate or vanadate/phosphate obtained according to the invention is well dispersible in aqueous media, diols, as are used in the reaction medium, and in lower alcohols, such as methanol or ethanol. This is ascribed to the fact that the polyol used in the reaction medium binds to the surface of the particles and renders the particles hydrophilic via the second hydroxy group. If the particles have a corresponding size (<30 nm), stable transparent or optionally also opalescent dispersions are obtained even at a high concentration.

If it is desired to disperse the metal vanadate or vanadate/phosphate according to the invention in another organic medium, in particular in an aprotic organic solvent, e.g. in methylene chloride, chloroform, toluene or xylene, the product of the synthesis or optional subsequent autoclaving step is subjected to a surface treatment. For this purpose, the nanoparticles are treated, advantageously at an increased temperature, e.g. 100 to 240° C., in particular 120 to 200° C., with an organic solvent which has a polar functional group binding to the surface of the nanoparticles and a hydrophobic molecular part. The total number of carbons of this solvent preferably ranges from 4 to 40, more preferably from 6 to 20, in particular from 8 to 16 carbon atoms. The functional group can e.g. be selected from hydroxy, carboxylic acid (ester), amine, phosphoric acid (ester), phosphonic acid (ester), phosphinic acid (ester), phosphane, phosphane oxide, sulfuric acid (ester), sulfonic acid (ester), thiol or sulfide. The functional group can also be connected to a plurality of hydrophobic groups. The hydrophobic group is preferably a hydrocarbon residue, e.g. an aliphatic, aromatic or aliphatic-aromatic residue, e.g. alkyl, phenyl or benzyl or methyl-phenyl. Preferred examples are monoalkyl amines having 6 to 20 carbon atoms, such as dodecyl amine or trialkyl phosphates, such as tributyl phosphate (TBP) or tris(2-ethylhexyl)phosphate (TEHP).

After this surface modification, the particles of the invention are dispersible in common organic solvents at a high concentration. This property can also be utilized for the introduction of the nanoparticles into a polymer medium, in that the polymer is dissolved in a suitable nanoparticule dispersion, after which the dispersion solvent is evaporated.

Thus, with the method according to the invention, a high yield of nanoparticulate metal(III) vanadate or vanadate/phosphate is obtained which are both characterized by a narrow particle size distribution. The direct synthesis product can be incorporated into a suitable medium, without further purification and size selection steps. The metal vanadate or vanadate/phosphate according to the invention can be dispersed in water, diols and lower alcohols at a high concentration and, after a corresponding surface modification, also in other organic solvents, in particular in organic aprotic solvents, such as toluene, xylene, chloroform or methylene chloride.

The somewhat smaller particle size of metal(III) vanadate/phosphate in comparison to vanadate obatained under corresponding synthesis conditions is also advantageous n that transparent dispersion are more easily obtained and the already low tendency of the particles to deposit from the dispersion is further reduced. Thus it has been found that metal(III) phosphate/vanadate mixed crystals can be easily dispersed without any dispersing aids or specific dispersing steps in concentrations up to approximately 25 wt. %. The resulting dispersion are extremely stable so that even after weeks no particle deposition is observed.

With the method according to the invention, good luminescence properties are obtained with doped luminescent metal vanadates or vanadate/phosphates, in particular if these are produced according to the second process embodiment or in line with the first embodiment including a subsequent autoclaving step. The method of the invention allows further a co-doping of $Eu^{3+}$-doped rare earth vanadate or vanadate/phosphate nanoparticles with bismuth, whereby an excitation of the particles with ultraviolet-A radiation ($\lambda$=320 to 400 nm) can be obtained. With a vanadate or vanadate/phosphate doped with bismuth and/or europium, the doping degree preferably ranges from 0.1 to 25 mole %, the best luminescence properties being obtained with a doping degree of approximately 5 mol %.

The nanoparticles thus produced can be industrially used for various applications, e.g. in transparent printing dyes, inks, coatings for substrates (metal, polymer material, etc.), polymer materials, etc., which exhibit luminescence when being excited with ultraviolet light. This is e.g. of interest for a security marking of documents and bank notes. Further fields of application for the luminescent vanadates or vanadate/phosphates, in particular gadolinium or yttrium vanadates or vanadate/phosphates, doped with bismuth and/or europium, are the production of coloured pixels on the television screen, in cathode ray tubes and fluorescence lamps. In addition, the above-described vanadates or vanadate/phosphates can be used as polarisators, laser material, scintillation material or the gadolinium compounds can be used as NMR contrast media. Here, the doped gadolinium vanadates or vanadate/phosphates are of particular interest since they can be used on the one hand in vivo as contrast media, but due to their luminescence properties also in in vitro diagnoses. An application of the claimed nanoparticles in catalysts in view of their high surface area is also conceivable.

The present invention will be illustrated in more detail by the following Examples.

III. EXAMPLES

Example 1

Synthesis of $YVO_4$:Eu Nanoparticles 1.44 g of $YCl_3.6H_2O$ (4.75 mmole) and 92 mg of $EuCl_3.6H_2O$ (0.25 mmole) are dissolved in 40 ml of ethylene glycol at circa 40° C. 662 mg of $Na_3VO_4$ (3.6 mmole) are dissolved in 2 ml of water, followed by the admixture of 18 ml of ethylene glycol thereto, and-the resulting mixture is added to the (Y,Eu)$Cl_3$ solution at room temperature under stirring. During the addition, the solution becomes for a short time turbid, but then clear and yellow.

60 ml of water is subsequently added and the solution is heated to approximately 120° C. while removing the water by distillation. The slightly opalescent solution is diluted with one part of water (i.e. to the double volume) after cooling and heated for 2 hours at 200° C. in an autoclave. The $YVO_4$:Eu nanoparticles are precipitated with acetone from the cooled colourless suspension, the precipitate is centrifuged, is washed twice with acetone and dried in vacuo (yield: 85 to 90%). The particles obtained had an average particle diameter of approximately 8.5 nm at a standard deviation of 20%. The particle size and the standard deviation were determined by means of an analytical ultra-centrifugation with an Optima XL-I of Beckman-Coulter.

The quantum yield of the particles thus obtained was 10.9%. It was measured at an excitation wavelength of $\lambda_{exc}$=274 nm with a Fluorolog fluorescence spectrometer of Jobin Yvon against Rhodamine 6G in water at 25° C.

Comparative Example 1

Synthesis of $YVO_4$:Eu Nanoparticles According to Huignard

The synthesis of $YVO_4$:Eu colloides was performed in accordance with the prescription of A. Huignard et al., *Chem. Mater.* 2002, 14, pages 2264-2269 by reaction of yttrium and europium nitrate, sodium citrate and $Na_3VO_4$ in water. The ratio of yttrium nitrate and europium nitrate was in correspondence with doping degrees of 5, 10, 15 and 20 mole % of Eu.

The $YVO_4$:Eu colloides doped with 5 to 20 mole % showed quantum yields between 6.5 and 7.7% under the measuring conditions ($\lambda$exc=270 nm) as indicated in example 1.

An autoclaving of the $YVO_4$:Eu colloides, as was performed in example 1 for increasing the quantum yield, was not possible. The particles obtained took on a brown colour and precipitated as coarse crystals, which can be ascribed to a thermal destruction of the citrate shell stabilizing the particles.

As can be seen from this comparative example, it is not preferred in accordance-with the invention that thermally instable metal-coordinating compounds, e.g. chelating agents such as citrates are used.

Example 2

Synthesis of $YVO_4$:Bi,Eu Nanoparticles 1.36 g of $YCl_3.6H_2O$ (4.5 mmole), 92 mg of $EuCl_3.6H_2O$ (0.25 mmole) and 83 mg of $BiCl_3.H_2O$ (0.25 mmole) are dissolved in 40 ml of ethylene glycol at approximately 40° C. 662 mg of $Na_3VO_4$ (3.6 mmole) are dissolved in 2 ml of water, followed by the admixture of 18 ml of ethylene glycol thereto and this is added at room temperature to the (Y,Eu,Bi)$Cl_3$ solution under stirring. During the addition the solution becomes turbid for a short time, but then clear and yellow.

Thereafter, 60 ml of water are added and the solution is heated to approximately 120° C. while removing the water by distillation. After cooling, the slightly opalescent solution is diluted with one part of water (i.e. to the double volume) and heated for 2 hours at 200° C. in an autoclave. The $YVO_4$:Bi,Eu nanoparticles are precipitated with acetone from the cooled colourless suspension, the precipitate is centrifuged, washed twice with acetone and dried in vacuo (yield: 85 to 90%)

Comparative Example 2

Synthesis of $YVO_4$:Bi,Eu Nanoparticles According to Huignard

An attempt was made to produce $YVO_4$:Bi,Eu colloides according to the prescription of A. Huignard et al., *Chem. Mater.* 2002, 14, pages 2264 to 2269. For this purpose, yttrium, bismuth and europium nitrate were dissolved in water in the molar ratios indicated in example 2, the solution already becoming brown during this procedure. After adding sodium citrate, the precipitation of bismuth salts was observed. Similar results were obtained when bismuth chloride was used instead of bismuth nitrate. An increased solubility of the bismuth salt was obtained only by the addition of ethylene glycol. But even then the dispersibility of the particles obtained was not satisfactory. It could further be recognized from the fluorescence spectrum that virtually no incorporation of bismuth into the lattice had taken place.

Example 3

Synthesis of $GdVO_4$:Bi,Eu Nanoparticles 1.18 g of $GdCl_3.6H_2O$ (4.5 mmole), 92 mg of $EuCl_3.6H_2O$ (0.25 mmole) and 83 mg of $BiCl_3.H_2O$ (0.25 mmole) are dissolved in 40 ml of ethylene glycol at approximately 40° C. 662 mg of $Na_3VO_4$ (3.6 mmole) are disscolved in 2 ml of water, 18 ml of ethylene glycol are added thereto and then added at room temperature to the (Gd,Eu,Bi)$Cl_3$ solution under stirring. During addition, the solution becomes turbid for a short time, but then clear and yellow.

60 ml of water is then added and the solution is heated to approximately 120° C while removing the water by distillation. After cooling, the slightly opalescent solution is diluted with one part of water (i.e. to the double volume) and heated in an autoclave for 2 hours at 200° C. The $GdVO_4$:Bi,Eu nanoparticles are precipitated with acetone from the cooled colourless suspension, the precipitate is centrifuged, washed twice with acetone and dried in vacuo (yield: 85 to 90%).

The quantum yield of the particles thus obtained was 10% with an excitation wavelength of $\lambda exc=274$ nm or 9% with an excitation wave length of $\lambda_{exc}=320$ nm. This was measured with a Fluorolog fluorescence spectrometer of Jobin Yvon against Rhodamin 6G in iso-propanol at 25° C.

Example 4

Synthesis of $YV_{0.7}P_{0.3}O_4$:Bi, Eu (3%, 7%)

$YCl_3 \times 6H_2O$ (2.731 g, 9 mmol), $BiCl_3 \times H_2O$ (100 mg, 0.3 mmol) and $EuCl_3 \times 6H_2O$ (257 mg, 0.7 mmol) were dissolved in 57 ml ethylene glycol. In a second flask $Na_3VO_4$ (1.283 g, 7 mmol) and $K_3PO_4 \times H_2O$ (692 mg, 3 mmol) were dissolved in 4 mol $H_2O$ followed by adding 43 ml ethylene glycol thereto. The resulting solution is added slowly at room temperature under vigorous stirring to the above metal salts solution. Thereafter, 100 ml water are added and the resulting transparent yellow reaction solution is transferred to an autoclave. Autoclaving (p=ca. 15 bar) is conducted for 2 h at 200° C. After cooling 300 ml acetone are added to the suspension and the resulting precipitate is centrifuged, washed twice with acetone and dried in vacuum. Yield: 2.037 g (99% of theoretical value).

Example 5

Synthesis of $YV_{0.7}P_{0.3}O_4$:Bi, Dy (3%, 0.5%)

$YCl_3 \times 6H_2O$ (2.927 g, 9.65 mmol), $BiCl_3 \times H_2O$ (102 mg, 0.3 mmol) and $DyCl_3 \times 6H_2O$ (18 mg, 0.05 mmol) were dissolved in 57 ml ethylene glycol. In a second flask $Na_3VO_4$ (1.283 g, 7 mmol) and $K_3PO_4 \times H_2O$ (692 mg, 3 mmol) were dissolved in 4 mol $H_2O$ followed by adding 43 ml ethylene glycol thereto. The resulting solution is added slowly at room temperature under vigorous stirring to the above metal salts solution. Thereafter, 100 ml water are added and the resulting transparent yellow reaction solution is transferred to an autoclave. Autoclaving (p=ca. 15 bar) is conducted for 2 h at 200° C. After cooling 300 ml acetone are added to the suspension and the resulting precipitate is centrifuged, washed twice with acetone and dried in vacuum. Yield: 1.891 g (94% of theoretical value).

Example 6

Synthesis of $GdVO_4$:Eu ($_5$%)

$GdCl_3 \times 6 H_2O$ (180.76 g, 486.4 mmol) and $EuCl_3 \times 6 H_2O$ (9.38 g, 25.6 mmol) are dissolved in 2.16 l ethylene glycol. In a second flask $Na_3VO_4$ (94.16 g, 512 mmol) is dissolved in 270 ml $H_2O$ followed by adding 1.1 l ethylene glycol thereto. The resulting solution is added at room temperature under vigorous stirring slowly to the above metal salt solution. Thereafter, 2 l water are added and the resulting transparent yellow reaction solution is transferred to a 10 l autoclave. Autoclaving is conducted at 165° C. (p=ca. 7 bar) for 4 h. After cooling 6 l acetone are added to the suspension and the resulting precipitate is centrifuged, washed twice with acetone and dried in vacuum. Yield: 135.59 g (quantitative).

The invention claimed is:

1. A composition comprising nanoparticles of metal (III) vanadate having only a polyol bound to the surface thereof, wherein said nanoparticles have a dimension of less than 30 nm.

2. The composition according to claim 1, wherein the nanoparticles of metal (III) vanadate are doped.

3. The composition according to claim 1, wherein said metal (III) is selected from elements of Group 13 of the Periodic Table, or bismuth, or the rare earth metals, optionally doped with one or a plurality of metals imparting luminescence and selected from lanthanides, indium, and bismuth.

4. The composition according to claim 1, wherein said nanoparticles of metal (III) vanadate have a composition selected from the group consisting of $BiVO_4$; $YVO_4$:Eu; $YVO_4$:Bi; $YVO_4$:Eu,Bi; $YVO_4$ doped with Tm, Tb, Ho, Er, Dy, Sm or In; $GdVO_4$:Nd; and $(Y_{0.82}Al_{0.07}La_{0.06})VO_4$:$Eu_{0.05}$.

5. The composition according to claim 1 wherein said at least one polyol has a molecular weight of not more than 200.

6. The composition according to claim 1, wherein said nanoparticles of metal (III) vanadate have said diameter of less than 30 nm at a standard deviation from the mean of less than 30%.

7. The composition according to claim 1, wherein the nanoparticles of metal (III) vanadate include a metal (III) vanadate/phosphate mixed crystal composition, which is optionally doped.

8. The composition according to claim 7, wherein said metal (III) vanadate/phosphate mixed crystal composition is selected from $BiV_{1-x}P_xO_4$; $YV_{1-x}P_xO_4$:EU; $YV_{1-x}P_xO_4$: Bi; $YV_{1-x}P_xO_4$:Eu,Bi; $YV_{1-x}P_xO_4$ doped with Tm, Tb, Ho, Er, Dy, Sm or In; $GdV_{1-x}O_4$:Eu; $GdV_{1-x}P_xO_4$:Bi; $GdV_{1-x}P_xO_4$:Eu,Bi; $GdV_{1-x}P_xO_4$,Tm,Ho; $GdV_{1-x}P_xO_4$:Nd; or $(Y_{0.82}Al_{0.07}La_{0.06})V_{1-x}P_xO_4$:$Eu_{0.05}$, wherein 0<x<1.

9. The composition according to claim 7, wherein the nanoparticles of metal (III) vanadate have the following formula:

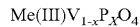

$Me(III)V_{1-x}P_xO_4$ wherein Me(III) is a trivalent metal atom and 0<x<1, wherein Me(III) can optionally be partially replaced with at least one doping metal atom.

10. The composition according to claim 9, wherein x is 0.3 to 0.5.

11. A composition comprising nanoparticles of metal (III) vanadate having only a polyol bound to the surface thereof, wherein said nanoparticles have a dimension of less than 30 nm and are obtained by a method comprising reacting, in a reaction medium, a reactive vanadate source that is dissolvable or dispersible in the reaction medium and a reactive metal (III) salt that is dissolvable or dispersible in the reaction medium under heating conditions, wherein the reaction medium contains water and at least one polyol at a volume ratio of 20/80 to 90/10.

12. The composition according to claim 11 wherein said at least one polyol has a molecular weight of not more than 200.

13. A composition comprising nanoparticles of doped metal (III) vanadate having only a polyol bound to the surface thereof, wherein said nanoparticles have a dimension of less than 30 nm an increased quantum yield relative to equivalent nanoparticles of doped metal (III) vanadate that are devoid of at said polyol bound to the surface thereof.

14. The composition according to claim 13 wherein said at least one polyol has a molecular weight of not more than 200.

15. A composition comprising nanoparticles of metal (III) vanadate having only a polyol bound to the surface thereof, wherein said nanoparticles have a dimension of less than 30 nm and wherein said polyol has a molecular weight of less than 200.

16. A composition comprising nanoparticles of metal (III) vanadate having only a polyol bound to the surface thereof, wherein said nanoparticles have an average diameter of 1 to 25 nm at a standard deviation from the mean value of less than 30%.

* * * * *